United States Patent [19]
Francis et al.

[11] 3,899,685
[45] Aug. 12, 1975

[54] OZONISERS

[75] Inventors: Peter Douglas Francis; Ronald Albert Redford, both of Chester; Philip Franklin Gale; Maurice Raymond Hillis, both of Cheshire, all of England

[73] Assignee: The Electricity Council, London, England

[22] Filed: Mar. 22, 1973

[21] Appl. No.: 343,761

[30] Foreign Application Priority Data
Mar. 23, 1972 United Kingdom.............. 13759/72

[52] U.S. Cl.............................. 250/536; 250/540
[51] Int. Cl.² ....................................... C01B 13/12
[58] Field of Search ............ 250/540, 535, 536, 537

[56] References Cited
UNITED STATES PATENTS

| | | | |
|---|---|---|---|
| 1,316,342 | 9/1919 | Walden | 250/540 |
| 1,512,285 | 10/1924 | Hartman | 250/540 |
| 1,575,049 | 3/1926 | Graef | 250/540 |
| 1,579,162 | 3/1926 | Starke et al | 250/540 |
| 3,400,071 | 9/1968 | Zwoboda | 250/536 |
| 3,455,803 | 7/1969 | Miller | 250/536 |
| 3,496,092 | 2/1970 | Fraser | 250/535 |
| 3,800,210 | 3/1974 | Caussin | 250/532 |

FOREIGN PATENTS OR APPLICATIONS
457,699   12/1936   United Kingdom................ 250/540

*Primary Examiner*—T. M. Tufariello
*Attorney, Agent, or Firm*—Browne, Beveridge, DeGrandi & Kline

[57] ABSTRACT

An ozoniser comprises a plurality of parallel electrode assemblies each consisting of concentric metal and dielectric tubes with a gap between them through which air or other oxygen containing gas is passed, the metal tube forming one electrode and a conductive liquid being provided on the surface of the dielectric remote from said gap to form the other electrode. The metal tube is cooled by a liquid flowing therethrough and the liquid of the liquid electrode is used to cool the dielectric tube. One of the electrodes may be earthed; the liquid or coolant for the other electrode is passed through long tubes of electrical insulating material to reduce the current through the liquid if the liquid is conductive.

One electrode is earthed and the other is switched alternately to the positive and negative terminals of a high voltage D.C. supply using thyratrons controlled by a variable frequency trigger pulse generator.

6 Claims, 6 Drawing Figures

OZONISERS

BACKGROUND OF THE INVENTION

1. Field of the Invention

This invention relates to ozonisers for producing ozone by an electrical discharge through air or other oxygen-containing gas.

2. Description of the Prior Art

For many industrial treatment processes, for example for the treatment of water or waterborne effluents, it is known to use air containing ozone may readily be produced by a high voltage discharge through air. To obtain a silent discharge without arcing and hence with less production of heat, the discharge is effected through air which lies between a metal electrode and a dielectric element, usually of glass, a second electrode being provided on the surface of the dielectric remote from the air. The second electric may be a conductive liquid, usually water. The dielectric is employed to obtain a silent discharge. Electrical charge is stored on the surface of the dielectric and hence the discharge ceases as soon as potential has built up across the dielectric. It is thus necessary in such systems to use an alternating potential. The liquid electrode is used to obtain good electrical contact with the dielectric over the whole effective surface thereof.

The amount of ozone produced is proportional to the discharge area and the power density in the discharge. Nearly all the electrical energy is dissipated as heat in the gas. If the power density is increased, the air is heated in the process and the ozone dissociates. Hence the practice heretofore has been to utilise equipment with very large discharge areas. For the large amounts of ozone which are required for many industrial treatment plants this leads to equipment which is bulky and expensive with large site construction costs.

British Specifications Nos. 1252996, 1235766, 1210614 and 1157727 are examples of ozonisers having two electrodes with dielectric between the electrodes.

SUMMARY OF THE INVENTION

According to the present invention, an ozoniser comprises a metal electrode facing a dielectric backed by a liquid electrode, means for passing air or other oxygen-containing gas between the metal electrode and the dielectric, a first cooling system for cooling said metal electrode with a liquid coolant for removing heat from the electrode, a second cooling system for cooling said dielectric by flow of or by circulating the liquid of said liquid electrode over the surface of said dielectric and means for applying between said electrodes an alternating voltage. This alternating voltage is typically at a frequency between 500 Hz and 20 KHz. Preferably the frequency is controllable to control the amount of ozone produced; it may be controllable for example over a range from 50 Hz to 20 KHz.

Heretofore, it has been the practice in large ozonisers to energise the electrodes at the frequency e.g., 50Hz, of a mains power supply. By using the higher frequency, it becomes possible to reduce the discharge area since the power density in the discharge can be increased. It would not be possible however merely to use a higher frequency on existing types of ozonisers. Increase of power density results in increase in the heat produced and this would lead, in a conventional ozoniser, to dissociation of the ozone. With the arrangement described above however the heat produced is removed by the use of the two separate coolants. The coolant for the dielectric is conveniently water. Tap water has sufficient conductivity that it can constitute the conductive part of the electrode; the dielectric material which may be glass, it made as thin as possible. The thinner the dielectric, the better is the heat transfer to the liquid coolant.

Conveniently one electrode is earthed and the other is at the high potential, alternately positive and negative with respect to earth. This high potential may typically be 20 KV. If the metal electrode is the high voltage electrode, the coolant need not be conductive. It is possible to use tap water as a coolant by employing elongate containers of electrical insulating material, e.g. long thin tubes of plastics insulating material, for leading the coolant into and out of the metal electrode; the resistance of the water in these elongate containers can readily be made sufficiently great that the power losses become negligible. However it is possible for the high voltage electrodes to use other coolants for example demineralised water. The coolant may be circulated in a closed circuit system through a heat exchanger.

The liquid electrode must be sufficiently conductive, in practice it is readily possible to utilise tap water as the electrode. If it is the high voltage electrode, long thin pipes of insulating material may be employed as described above or a closed circuit system through a heat exchanger may be employed for cooling the liquid.

A particular advantage arises from the use of a variable frequency alternating voltage in that the amount of ozone produced can be altered by altering the frequency. Preferably therefore an adjustable frequency generator is provided for producing the required voltage to the electrodes. When a high potential is applied between the two electrodes, the discharge current across the air gap causes a potential to build up across the dielectric material since charge is stored on the surface of the dielectric. This dielectric material becomes charged, the potential across the air gap falls and the discharge through the air is thus extinguished. The polarity of applied potential is then reversed in order to produce a further discharge. The applied potential must therefore be alternating. To obtain a discharge through an air gap of sufficient size to meet the practical requirements for ozonisers, a high voltage is required; typically a voltage of 20 KV might be employed. Since the discharge can only take place when the potential exceeds the value required to produce breakdown in the air, it is more efficient and clearly preferable to employ a switched direct potential having the required magnitude so that the discharge is initiated immediately the potential is switched. This requirement for a switched direct voltage, that is to say a voltage comprising constant amplitude pulses of alternate positive and negative polarity and with variable time interval between pulses, presents problems if the high voltage is to be obtained by using a transformer. Although, to a certain extent, it is possible to produce the required amplitude of the switched direct potential with a suitable transformer and shape the waveform using passive components, these will only be effective at a single operating frequency or over a very narrow band of frequencies. Thus changing the frequency over a wide range to vary the ozone output may cause appreciable power loss.

By using a high frequency for example up to 20KHz, it becomes possible to reduce the discharge area compared with that required in an ozoniser operating at for example the 50 Hz frequency of a mains power supply. This is because the power density in the discharge can be increased. This is a matter of substantial importance because, in commercial use, large volumes of ozone or ozonised air are required and existing types of ozonisers operating at 50 Hz are very bulky. It is not possible to control the production of ozone by a substantial amount by changing the voltage. There is a minimum voltage required to produce the discharge and a maximum voltage imposed by the electric strength of the dielectric. It is possible however to control the production by varying the frequency. For the reasons indicated above however it has not been possible to vary the frequency over a wide range in large ozonisers heretofore.

According to a further feature of the present invention, in an ozoniser as described above, means are provided for applying between said electrodes a direct potential, switched to be alternately of opposite polarity, said means comprising positive and negative polarity high voltage supply lines with power supply means including a step-up transformer and rectifiers for maintaining positive and negative direct voltages with respect to a datum potential (conveniently earth) on said supply lines, means connecting one electrode of said pair to a point at said datum potential, first and second switches each having first and second terminals between which connection is made by application of an electrical operating pulse to the switch, and means connecting the other electrode of the said pair both to the second terminal of the first switch and the first terminal of the second switch, the first terminal of the first switch and the second terminal of the second switch being connected respectively to said positive and negative supply lines, and a controllable frequency pulse generator arranged to apply operating pulses alternately at a controllable frequency to the two switches whereby they conduct alternately.

The two switches may be mechanical switches or vacuum switches. Preferably however they are grid-controlled gas discharge devices, conveniently thyratrons which are fired alternately by trigger pulses on their control grids. Preferably two storage capacitors are connected respectively between the two supply lines and said datum potential point.

With this construction, when a trigger pulse is applied to the control grid of one of the gas discharge devices, that device becomes conductive and hence the potential on the high voltage supply line to which that device is connected is applied to the second electrode of the ozoniser. In the ozoniser, a discharge will start through the oxygen-containing gas but this will extinguish itself as the potential builds up across the dielectric due to the charge stored on the surface of the dielectric. When the discharge is extinguished, no current will flow through the gas discharge device and hence that device will become cut-off. On application of the next trigger pulse to the other gas discharge device, a potential of opposite polarity is connected to the second electrode of the ozoniser and a discharge in the opposite direction will take place between the electrodes of the ozoniser with the charge on the dielectric becoming reversed in polarity. This discharge will extinguish itself in the same way as before and hence the second gas discharge device will then become extinguished. The operation thus proceeds cyclicly in this manner. The maximum frequency of operation will depend on the time period before the discharge in the ozoniser extinguishes itself. The trigger pulses must be shorter than half a cycle at this maximum frequency. In practice, frequencies up to 20 KHz may readily be obtained. It will be seen that this arrangement provides a switched DC voltage on the ozoniser. The operating voltage can be kept just above the voltage necessary for inception of discharge so thereby to reduce the risk of damaging the dielectric material with arcing at points of high electric field strength. The frequency can readily be controlled over a wide range, for example from 50 Hz to 20 KHz, by adjusting the trigger pulse frequency. Due to the reasons aforementioned, the efficiency of the ozoniser remains substantially constant over the whole frequency range. The trigger pulses are relatively low voltage pulses and it is readily possible to produce short duration low voltage pulses at an adjustable frequency over a wide range of frequencies.

In one convenient form of construction of the electrode system, the electrodes are tubular. The metal electrode is preferably the high voltage electrode; this electrode may be formed as an inner tube within a dielectric tube with means for circulating the liquid coolant over the inner surface of the metal tube. The outer electrode, in this case, is the liquid outside the dielectric tube and means may be provided for circulating conductive coolant (forming the liquid electrode) over the outer surface of this dielectric tube. The spacing between the electrodes is preferably uniform over the greater part of their length. At the ends of the discharge region between the electrodes the spacing between the electrode may be increased compared with that over the discharge region by suitable shaping of one or both of the electrodes thereby avoiding the formation of discharge streamers at the ends of the electrodes.

A single metal electrode may be employed with a concentric dielectric tube but, to obtain a higher output, a number of such electrode assemblies may be connected in parallel electrically. The assemblies are preferably arranged parallel to one another physically, conveniently extending in upright direction. If the dielectric tubes are outside the metal tubes, a common conductive coolant forming the liquid electrode may surround the dielectric tubes. The coolant for the metal electrodes in this case conveniently is fed from headers at the two ends of the electrode assembly.

In a construction having for the or each electrode assembly, concentric tubes, one metal and the other dielectric, conveniently the outer tubes, near their ends, pass through and are sealed into two plates; the inner electrodes may be positioned centrally in the outer tubes by means of further locating plates beyond the aforementioned plates. The further plates, in conjunction with end caps may form the aforementioned headers whilst the two first mentioned plates form part of the wall structure of a chamber for containing a coolant liquid surrounding the outer tubes.

BRIEF DESCRIPTION OF THE DRAWINGS

Referring to FIG. 1 there is illustrated an electrode assembly for a large capacity ozoniser having a plurality of concentric electrode assemblies. Each electrode assembly comprises an inner metal electrode 10 coaxially located within a dielectric tube 11, conveniently of stainless steel or aluminum. Dielectric tubes 11, which are formed of heat resisting soda alumina borosilicate glass, are located by means of polytetrafluoroethylene (PTFE) gaskets 12 in metal end plates 13, 14, forming the upper and lower end walls of a cylindrical container 15 formed of metal, conveniently stainless steel. This container 15, contains a conductive coolant, e.g. tap water which is circulated through the chamber formed by container 15, entering at inlets 16 near the bottom of the chamber and leaving at outlets 17. This coolant constitutes a common liquid electrode for all the electrode assemblies. The gaskets 12 form watertight seals in the end plates 13, 14. Electrically, the walls of the chamber are earthed as indicated at 18.

Figure 1:
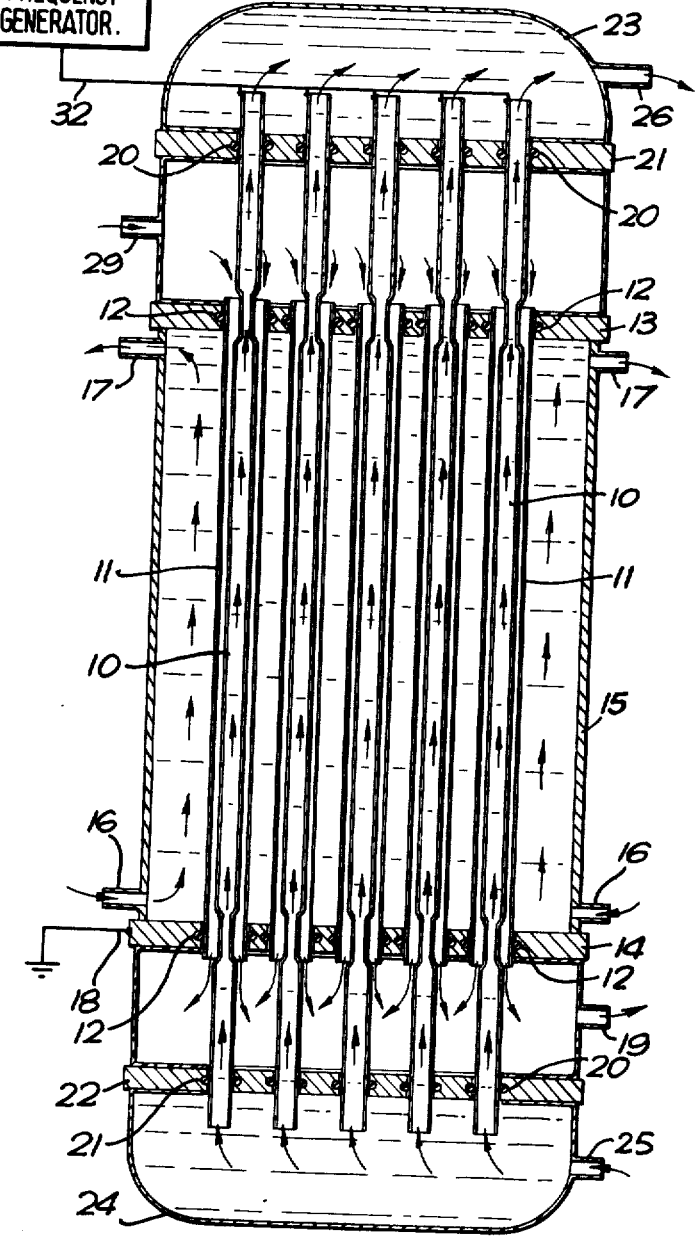
FIG. 1 is a diagrammatic section through the electrode assemblies of an ozoniser.

The inner metal electrodes 10 are located by gaskets 20 in locating holes drilled in stainless steel end plates 21, 22 situated beyond the aforementioned plates 13, 14. These end plates 21, 22 have caps 23, 24 respectively secured on them. The coolant for the inner metal electrode passed through an inlet tube 25 into the cap 24 and thence upwardly through the inner tubes 10 into the top cap 23, and so out through an outlet 26. The oxygen-containing gas, usually air or oxygen-enriched air or oxygen is passed in through an inlet 29 into the region between the aforementioned plates 13, 21 and then passes downwardly through the annular region between the two tubes 10, 11 into the region between the two bottom plates 14, 22 and thence out through the outlet 19. Electrically the inner metal electrodes are energised alternately with a positive and negative voltage at an adjustable frequency from a variable frequency high voltage alternating supply source 31. To prevent arcing or discharge streamers at the points where the metal inner electrodes 10 pass through the holes in the end plates 13, 14, the discharge gap is increased by a reduction in diameter of the inner metal tubes 10.

The conductive coolant forms the conductor of the one electrode and cools the dielectric; this coolant is electrically earthed as indicated at 18 by an electrical connection to the metal container 15.

The inner electrodes 10 are electrically energised by means of a connector 32, extending through the metal top cap 23, from the supply source 31 which is typically a high frequency generator operating in the range of 1 to 20 KHz. This generator, as described later with reference to FIG. 6, comprises an adjustable frequency trigger pulse generator for triggering two switching thyratrons. These thyratrons connect the inner electrodes 10 alternately to positive and negative potential lines maintained at suitable direct voltages e.g., 20 KV with respect to earth. These lines may be fed by means of a rectifier for rectifying the voltage on the secondary of a 50 Hz step-up transformer fed from a mains supply. The outer container 15 is electrically insulated from the top cap 23 by means of the air flow header between the plates 13, 21 and from the bottom cap 24 by the air flow header between plates 14, 22. The height of the conductive liquid surrounding the dielectric tubes 11 defines the upper boundary of the discharge volume and this is determined by the height of the aforementioned drain tubes 17.

With the construction described above, the metal tubes 10 will be at the high voltage with respect to earth and thus the coolant within the top and bottom caps, if it is electrically conductive, will also be at this high voltage. It is possible to use a coolant which is electrically non-conductive or to use a coolant which is circulated in a closed path through a heat exchanger formed of electrically insulating material. It is convenient however to use water as the coolant, for example ordinary tap water. In this case, the coolant may be circulated through long small diameter tubes of plastics insulating material; the tubes can readily be made so that resistance of the water in these tubes is such as to give negligible power loss.

The metal electrodes 10 are made as thin as possible, consistent with sufficient structural strength, in order to give good heat transfer through the electrodes. Similarly the glass tubes 11 are also made as thin as possible, consistent with sufficient structural strength to provide good heat transfer. The power density in the discharge can be controlled by adjusting the frequency of excitation as will be described later.

In the construction of FIG. 1, the metal tubes 10 are inside the glass tubes 11. It is possible however to put the glass tubes inside the metal tubes. Also in FIG. 1 the liquid electrode is earthed and the metal tubes 10 are at the high voltage; the converse arrangement can be employed. Thus there are four possible arrangements in considering which electrode is earthed and which tube is the inner tube. These are shown diagrammatically in FIGS. 2, 3, 4 and 5.

Figure 2:
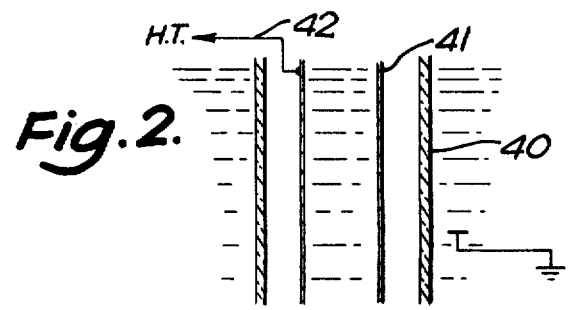
FIGS. 2 to 5 are four diagrams for explaining modifications of the arrangement of FIG. 1.

FIG. 2 shows the construction employed in FIG. 1. A glass tube 40 is outside a metal tube 41 which is connected to the high voltage source 42. This construction has the advantage that the liquid electrode which has to be a high conductivity liquid is earthed and there is therefore no problem in using continuously flowing water. It may be mentioned here that ozonisers are used particularly for the treatment of water and water borne effluents and, in such plants, water supplies for cooling are readily available.

Figure 3:
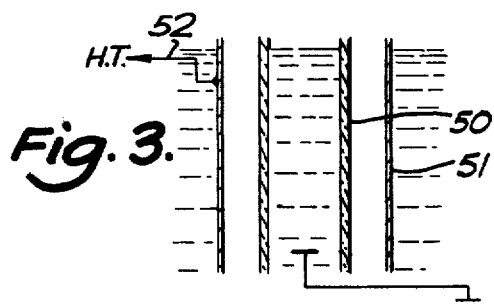

FIG. 3 shows a construction in which a glass tube 50 is inside a metal tube 51, the metal tube being connected as indicated at 52 to the high voltage source. Compared with the FIG. 1 construction, this arrangement facilitates withdrawal and replacement of the glass tubes. However, to increase the width of the air gap at the ends of the discharge region it would be necessary either to make the glass tubes narrower or to give an enlarged diameter to the metal tubes.

Figure 4:
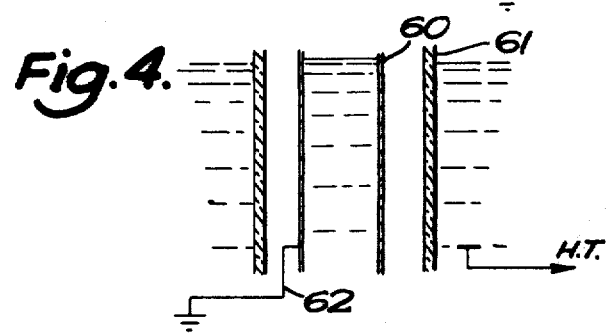
Figure 5:
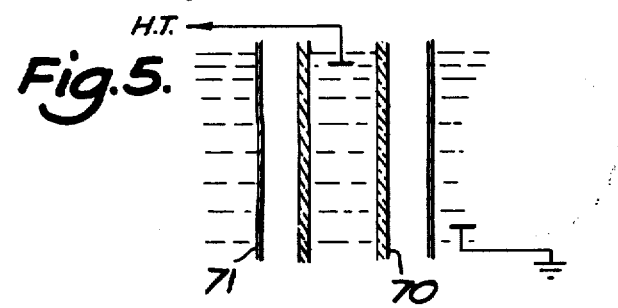

FIG. 4 shows a construction with a metal tube 60 inside a glass tube 61. The metal tube is earthed as indicated at 62 and the liquid electrode surrounding the dielectric has to be at the switched high potential. FIG. 5 shows a glass tube 70 inside a metal tube 71 but again with the liquid electrode at the switched high potential. In this arrangement of FIGS. 4 and 5, the electrical contact between the liquid electrode and the glass is more critical than when the glass surface has always to be at earth potential. For a high power ozoniser, it may be necessary to put a metal contact element or elements on the glass tube.

Figure 6:
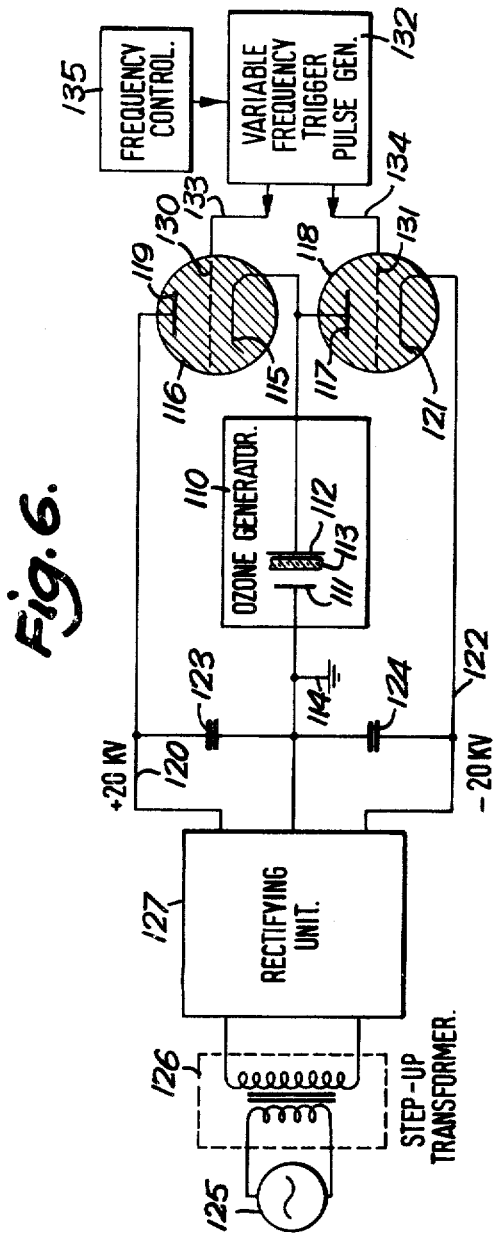
FIG. 6 illustrates diagrammatically circuit means for applying a switched direct potential to the electrodes of the ozoniser.

In FIG. 6, the ozoniser is shown as comprising an ozone generator illustrated diagrammatically by the rectangle 110 together with associated electrical circuits. The ozone generator is shown as containing two electrodes 111, 112 with a sheet of dielectric material 113 between the electrodes.

One of the electrodes, for example the electrode 111 in the drawing, is connected to earth as shown at 114. The other electrode 112 of the ozoniser is connected both to the cathode 115 of thyratron 116 and to the anode 117 of a thyratron 118. The anode 119 of the thyratron 116 is connected to a positive voltage direct potential supply line 120 which is typically at 20 KV above earth. The cathode 121 of the thyratron 118 is connected to a negative potential supply line 122 which is typically at −20KV with respect to earth. Storage capacitors 123, 124 are connected respectively between the supply lines 120, 122 and earth.

The supply lines 120, 122 are maintained at their appropriate potential by energisation from an alternating current supply source 125 via step up transformer 126 and rectifying means 127 providing direct voltage outputs with respect to earth. Although a single phase transformer has been shown diagrammatically, typically for a large ozoniser, a three phase supply would be employed which is applied by a star/star connected three phase transformer to a three phase rectifying system. Such rectifying systems however are well known in the art and will not be further described.

Control grids 130, 131 of the thyratron 116, 118 respectively are connected to a trigger pulse source 132. This trigger pulse source 132 is a variable frequency pulse generator providing short duration output pulses alternately on lines 133, 134 which are connected respectively to the two control grids 130, 131. The duration of these output pulses is less than half a cycle at the maximum frequency of operation. The frequency is controlled by frequency control means 135. These may be manual control means but more generally they would be automatic control means controlling the frequency in accordance with some measured parameter which may depend on the use to which the ozone is put. It would be possible, for example, to control the ozone output by means of an in-line ozone detector in the output of the ozoniser whereby the ozone concentration in the output is maintained at the required value. More generally however if the ozone is being utilised in a treatment plant, for example for the treatment of water or water borne effluents, then the control might be effected in accordance with measurements made on the treated material from the plant to provide an overall feedback control.

The electrical circuit means described above permits of applying substantially constant voltage pulses of opposite polarity to the electrodes of the ozoniser whilst allowing of control of the operating frequency over a very wide frequency range.

We claim:

1. An ozoniser having at least one pair of electrodes with an oxygen-containing gas and dielectric material in the gap between the electrodes wherein means are provided for applying between said electrodes a direct potential, switched to be alternately of opposite polarity, said means comprising a step-up transformer having primary and secondary windings with at least one primary winding arranged for energisation from an alternating power supply source, rectifying means connected to said secondary windings to produce a high voltage direct power supply, power supply lines connected to said rectifying means to be maintained at positive and negative direct voltages with respect to a datum potential, means connecting one electrode of said pair to a point at said datum potential, means connecting the other electrode of said pair both to the cathode of a first grid-controlled gas discharge device and the anode of the first gas discharge device and the cathode of the second gas discharge device being connected respectively to said positive and negative supply lines, and a controllable frequency pulse generator arranged to apply trigger pulses alternately at a controllable frequency to control grids of the two gas discharge devices whereby they fire alternately.

2. An ozoniser as claimed in claim 1 wherein said grid-controlled gas discharge devices are thyratrons.

3. In an ozoniser comprising a metal electrode facing a dielectric backed by a conductive liquid electrode, means for passing oxygen-containing gas between the metal electrode and dielectric, a first cooling system for cooling said metal electrode with a liquid coolant for removing heat from the electrode, a second cooling system for cooling said dielectric by flow of or by circulating the liquid of said liquid electrode over the surface of the dielectric; the improvement comprising means for applying between said electrodes an alternating voltage comprising positive and negative polarity high voltage supply lines, power supply means including a step-up transformer and rectifiers connected to said transformer to rectify the stepped-up voltage therefrom, said rectifiers furthermore being connected to said high voltage supply lines for maintaining positive and negative voltates with respect to a datum potential, means connecting one electrode of said electrodes to a point at said datum potential, first and second switches each having first and second terminals between which connection is made by application of an electrical operating pulse to the switch, means connecting the other electrode of said electrodes both to the second terminal of the first switch and the first terminal of the second switch, the first terminal of the first switch and the second terminal of the second switch being connected respectively to said positive and negative supply lines, and a controllable frequency pulse generator arranged to apply operating pulses alternately at a controllable frequency to the two switches whereby they conduct alternately.

4. An ozoniser as claimed in claim 3 wherein said switches are grid-controlled gas discharge devices.

5. An ozoniser as claimed in claim 3 wherein two storage capacitors are connected respectively between the two supply lines and said datum potential point.

6. An ozoniser as claimed in claim 3 wherein said controllable frequency pulse generator is arranged to produce a pair of control pulses for the two switches at a controllable frequency between 50 Hz and 20 KHz.

* * * * *